United States Patent
Li

(10) Patent No.: US 11,424,797 B2
(45) Date of Patent: Aug. 23, 2022

(54) DATA TRANSMISSION METHOD AND APPARATUS

(71) Applicant: BEIJING XIAOMI MOBILE SOFTWARE CO., LTD., Beijing (CN)

(72) Inventor: Mingju Li, Beijing (CN)

(73) Assignee: BEIJING XIAOMI MOBILE SOFTWARE CO., LTD., Beijing (CN)

(*) Notice: Subject to any disclaimer, the term of this patent is extended or adjusted under 35 U.S.C. 154(b) by 0 days.

(21) Appl. No.: 17/406,772

(22) Filed: Aug. 19, 2021

(65) Prior Publication Data

US 2021/0384951 A1 Dec. 9, 2021

Related U.S. Application Data

(63) Continuation of application No. PCT/CN2019/075860, filed on Feb. 22, 2019.

(51) Int. Cl.
| | |
|---|---|
| *H04L 5/12* | (2006.01) |
| *H04B 7/06* | (2006.01) |
| *H04B 7/08* | (2006.01) |
| *H04W 72/04* | (2009.01) |

(52) U.S. Cl.
CPC ......... *H04B 7/0608* (2013.01); *H04B 7/0639* (2013.01); *H04B 7/0802* (2013.01); *H04W 72/042* (2013.01); *H04W 72/046* (2013.01)

(58) Field of Classification Search
CPC .. H04B 7/0608; H04B 7/0639; H04B 7/0802; H04W 72/042; H04W 72/046
USPC ........ 375/262, 261, 260, 259, 219, 295, 316
See application file for complete search history.

(56) References Cited

U.S. PATENT DOCUMENTS

11,160,061 B2 * 10/2021 Xiong ................... H04W 76/27
2019/0045494 A1   2/2019 Ho et al.

OTHER PUBLICATIONS

PCT/CN2019/075860 English translation of International Search Report dated Oct. 14, 2019, 2 pages.

\* cited by examiner

*Primary Examiner* — Zewdu A Kassa
(74) *Attorney, Agent, or Firm* — Lathrop GPM LLP

(57) ABSTRACT

Disclosed are a data transmission method and apparatus. The method includes: receiving, by a terminal, a media access control (MAC) signaling sent by a base station; receiving, by the terminal, downlink control information (DCI) sent by the base station; searching for a preset mapping relationship by the terminal; determining, by the terminal, a target beam used by the target antenna panel to transmit data according to the target beam indication information corresponding to the target antenna panel; and transmitting data by the terminal with the base station via the target beam corresponding to the target antenna panel.

15 Claims, 3 Drawing Sheets

DATA TRANSMISSION METHOD AND APPARATUS

CROSS-REFERENCE TO RELATED APPLICATION

The present application is a continuation application of PCT application No. PCT/CN2019/075860, filed on Feb. 22, 2019, the entirety contents of which are incorporated herein by reference.

TECHNICAL FIELD

The disclosure relates to the field of communication technologies, and more particularly, to a data transmission method, and a data transmission apparatus.

BACKGROUND

In a 5G NR (New Radio) system, a base station and a terminal transmit and receive information through beams. For example, control signaling and service data exchanged between the base station and the terminal are transmitted and received through beams.

When the base station and/or terminal have multiple antenna panels, data transmission between the base station and the terminal is performed through beams on different antenna panels. Using downlink data transmission as an example, in the case where the base station has multiple antenna panels, the base station sends downlink data to the terminal separately through different antenna panels, that is, downlink data is transmitted to the terminal separately through transmission beams in different directions. Correspondingly, the terminal receives the beams through different antenna panels to respectively receive the downlink data transmitted by the base station through the beams on different antenna panels.

In the multi-antenna panel scenario, if beams transmitted and received between the base station and the terminal do not match, errors may occur in the received data and success rate of data transmission is affected.

SUMMARY

Embodiments of the disclosure provide a data transmission method, and a data transmission apparatus. The technical solution is provided as follows.

Embodiments of the disclosure provide a data transmission method. The method includes: receiving, by a terminal, a media access control (MAC) signaling sent by a base station, the MAC signaling is configured to activate multiple pieces of beam indication information separately corresponding to multiple antenna panels, the beam indication information associated with an antenna panel is configured to indicate beam(s) of the corresponding antenna panel for transmitting data; receiving, by the terminal, downlink control information (DCI) sent by the base station, wherein beam indication codepoints in the DCI are configured to indicate multiple pieces of target beam indication information separately corresponding to n antenna panels in the multiple antenna panels, the target beam indication information corresponding to one target antenna panel in the n antenna panels is one piece of the beam indication information corresponding to the target antenna panel activated by the MAC signaling, and n is a positive integer; searching for a preset mapping relationship by the terminal so as to obtain the beam indication information corresponding to the beam indication codepoints and determine the beam indication information as the beam indication information corresponding to the n antenna panels; determining, by the terminal, a target beam used by the target antenna panel to transmit data according to the target beam indication information corresponding to the target antenna panel; and transmitting data by the terminal with the base station via the target beam corresponding to the target antenna panel.

Embodiments of the disclosure provide a data transmission method. The method includes: sending, by a base station, a media access control (MAC) signaling to a terminal, in which the MAC signaling is configured to activate beam indication information corresponding to multiple antenna panels, the beam indication information associated with an antenna panel is configured to indicate beam(s) of the corresponding antenna panel for transmitting data; sending, by the base station, a downlink control information (DCI) to the terminal, in which beam indication codepoints contained in the DCI are configured to indicate multiple pieces of target beam indication information separately corresponding to n antenna panels in the multiple antenna panels, the target beam indication information corresponding to one target antenna panel in the n antenna panels is one piece of the beam indication information corresponding to the target antenna panel activated by the MAC signaling, and n is a positive integer; and transmitting data by the base station with the terminal via the n antenna panels.

Embodiments of the disclosure provide a data transmission apparatus, applied to a terminal. The apparatus includes: one or more processors; a memory storing instructions executable by the one or more processors; in which the one or more processors are configured to: receive, by a terminal, a media access control (MAC) signaling sent by a base station, wherein the MAC signaling is configured to activate multiple pieces of beam indication information separately corresponding to multiple antenna panels, the beam indication information associated with an antenna panel is configured to indicate beam(s) of the corresponding antenna panel for transmitting data; receive, by the terminal, downlink control information (DCI) sent by the base station, wherein beam indication codepoints in the DCI are configured to indicate multiple pieces of target beam indication information separately corresponding to n antenna panels in the multiple antenna panels, the target beam indication information corresponding to one target antenna panel in the n antenna panels is one piece of the beam indication information corresponding to the target antenna panel activated by the MAC signaling, and n is a positive integer; search for a preset mapping relationship by the terminal so as to obtain the beam indication information corresponding to the beam indication codepoints and determine the beam indication information as the beam indication information corresponding to the n antenna panels; determine, by the terminal, a target beam used by the target antenna panel to transmit data according to the target beam indication information corresponding to the target antenna panel; and transmit data by the terminal with the base station via the target beam corresponding to the target antenna panel.

It should be understood that the above general description and the following detailed description are only exemplary and explanatory, which cannot limit the disclosure.

BRIEF DESCRIPTION OF THE DRAWINGS

The accompanying drawings, which are incorporated in and constitute a part of this specification, illustrate embodiments consistent with the disclosure and, together with the description, serve to explain the principles of the disclosure.

DETAILED DESCRIPTION

Reference will now be made in detail to exemplary embodiments, examples of which are illustrated in the accompanying drawings. The following description refers to the accompanying drawings in which the same numbers in different drawings represent the same or similar elements unless otherwise represented. The implementations set forth in the following description of exemplary embodiments do not represent all implementations consistent with the disclosure. Instead, they are merely examples of apparatuses and methods consistent with aspects related to the disclosure as recited in the appended claims.

The network architecture and business scenarios in the embodiments of the disclosure are intended to more clearly illustrate the technical solution of the embodiments of the disclosure, and do not constitute a limitation on the technical solution provided by the embodiments of the disclosure. Those skilled in the art knows that with the evolution of the network architecture and the emergence of new business scenarios, the technical solution of the embodiments of the disclosure is equally applicable to similar technical problems.

Figure 1:
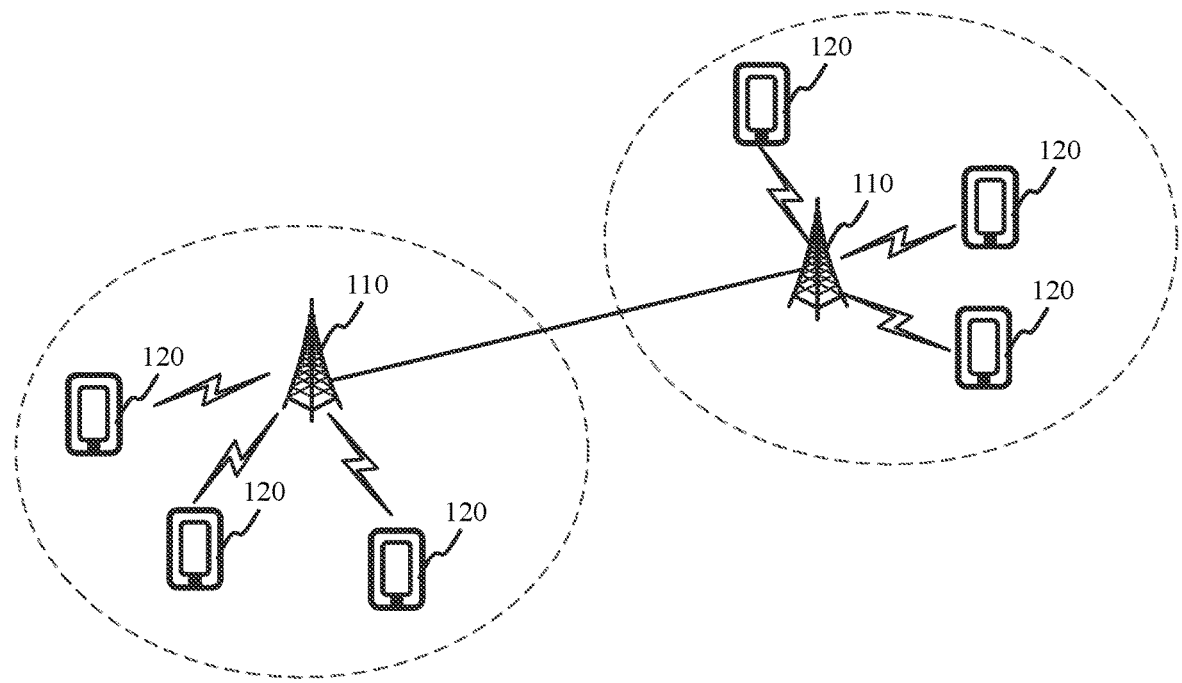
FIG. 1 is a schematic diagram of a network architecture according to an exemplary embodiment.

FIG. 1 is a schematic diagram of a network architecture according to an exemplary embodiment. The network architecture may include: a base station 110 and a terminal 120.

The base station 110 is deployed in an access network. The access network in the 5G NR system is called NG-RAN (New Generation-Radio Access Network). The base station 110 and the terminal 120 communicate with each other through a certain air interface technology, or through cellular technology.

The base station 110 is a device deployed in an access network to provide the terminal 120 with a wireless communication function. The base station 110 may include various forms of macro base stations, micro base stations, relay stations, access points, and so on. In systems using different wireless access technologies, names of devices with base station functions may be different. For example, in the 5G NR systems, the devices are called gNodeB or gNB. As communication technology evolves, the name "base station" may change. For ease of description, in the embodiments of the disclosure, the devices for providing wireless communication functions for the terminal 120 are collectively referred to as the base station.

There is usually a plurality of terminals 120, and one or more terminals 120 may be distributed in a cell managed by each base station 110. The terminal 120 may include various handheld devices with wireless communication functions, vehicle-mounted devices, wearable devices, computing devices or other processing devices connected to a wireless modem, as well as various forms of user equipment (UE), mobile station (MS) and terminal device. For ease of description, in the embodiments of the disclosure, the above devices are collectively referred to as terminals.

The "5G NR system" in the embodiments of the disclosure may also be referred to as a 5G system or an NR system, which is understood by those skilled in the art. The technical solution described in the embodiments of the disclosure may be applicable to the 5G NR system, and may also be applicable to a subsequent evolution system of the 5G NR system.

For each antenna panel transmitting PDSCH (Physical Downlink Shared Channel), the base station instructs the terminal to receive the beam in the following way. The base station informs the terminal of multiple (for example, up to 64 or 128) TCI states through RRC (Radio Resource Control) signaling. Afterwards, the base station activates several of the above multiple TCI states (for example, up to 8) TCI states, the DCI is used to inform the terminal which of the above activated TCI states is used for receiving the PDSCH. The TCI state notified by the DCI is the transmission state configuration of the PDSCH of the base station to the terminal, that is, the terminal is notified that the receiving beam used when receiving the downlink data on the PDSCH is the same as the receiving beam used to receive an RS (Reference Signal) corresponding to the TCI state. After that, the terminal uses the above determined receiving beam to receive downlink data on the PDSCH.

Each TCI state corresponds to an RS identifier (also called an RS index), which is used to uniquely indicate the RS. Different RSs have different RS identifiers. In the embodiments of the disclosure, the RS may be NZP CSI-RS (Non-Zero Power Channel State Information Reference Signal), or SSB (Synchronization Signal Block), or other reference signal, which is not limited in the embodiments of the disclosure. The correspondences between the TCI state and the RS identifier is shown in Table-1 as an example.

TABLE 1

| TCI state | RS index |
|---|---|
| TCI#0 | SSB index#1 |
| TCI#1 | SSB index#2 |
| TCI#2 | CSI-RS index#5 |
| TCI#3 | CSI-RS index#6 |
| TCI#4 | SSB index#3 |
| . . . | . . . |

Assuming that the base station informs the terminal to use TCI #0 through DCI, it means that the terminal is informed to use the receiving beam which is used when receiving SSB index #1 to receive the PDSCH. The implicit meaning of the base station is that the base station uses the transmitting beam of SSB index #1 to transmit the PDSCH of this period to the terminal. It is best for the terminal to use the same receiving beam as SSB index #1 when receiving the PDSCH in this period.

For the scenario of multiple antenna panels, the base station may have multiple antenna panels. The base station sends downlink data to the terminal through the transmitting beams on the multiple antenna panels, and receives the uplink data transmitted by the terminal through the receiving beams on the multiple antenna panels. The above multiple antenna panels may belong to the same TRP (Transmitter Receiver Point), or may belong to multiple different TRPs. That is, the base station may have one or more TRPs, and each TRP may have one or more antenna panels, and different antenna panels correspond to different beam directions.

Similarly, the terminal may have multiple antenna panels. The terminal receives downlink data transmitted by the base station through the receiving beams on the multiple antenna panels, and sends uplink data to the base station through the sending beams on the multiple antenna panels. Different antenna panels correspond to different beam directions.

Taking the following downlink data transmission as an example, the base station dynamically switches to the antenna panels transmitting PDSCH to the same terminal. For example, the base station has the following two antenna panels: panel #1 and panel #2. The base station uses panel #1 to transmit PDSCH to a certain terminal within a period of time, and then the base station dynamically switches to the antenna panel for the terminal to transmit PDSCH, such as switching to use panel #2 to transmit PDSCH to the terminal, or switch to use panel #1 and panel #2 to transmit PDSCH to the terminal at the same time. After switching to the antenna panel used by the base station to transmit the PDSCH to the terminal, if the terminal does not adjust the receiving beam used to receive the PDSCH, the transmitting beam and the receiving beam between the base station and the terminal do not match, resulting in errors on receiving data, so that the success rate of data transmission is affected. Similarly, uplink data transmission has the same problem.

In the technical solution of the disclosure, for the multi-antenna panel scenario, the base station transmits the MAC signaling and DCI to the terminal to indicate the target beam adopted when the target antenna panel is used to transmit data to the terminal, which enables the terminal to select the correct beam to transmit data for different antenna panels, and improves the success rate of data transmission in the multi-antenna panel scenario. In the following, several embodiments are used to introduce and explain the technical solution of the disclosure.

Figure 2:
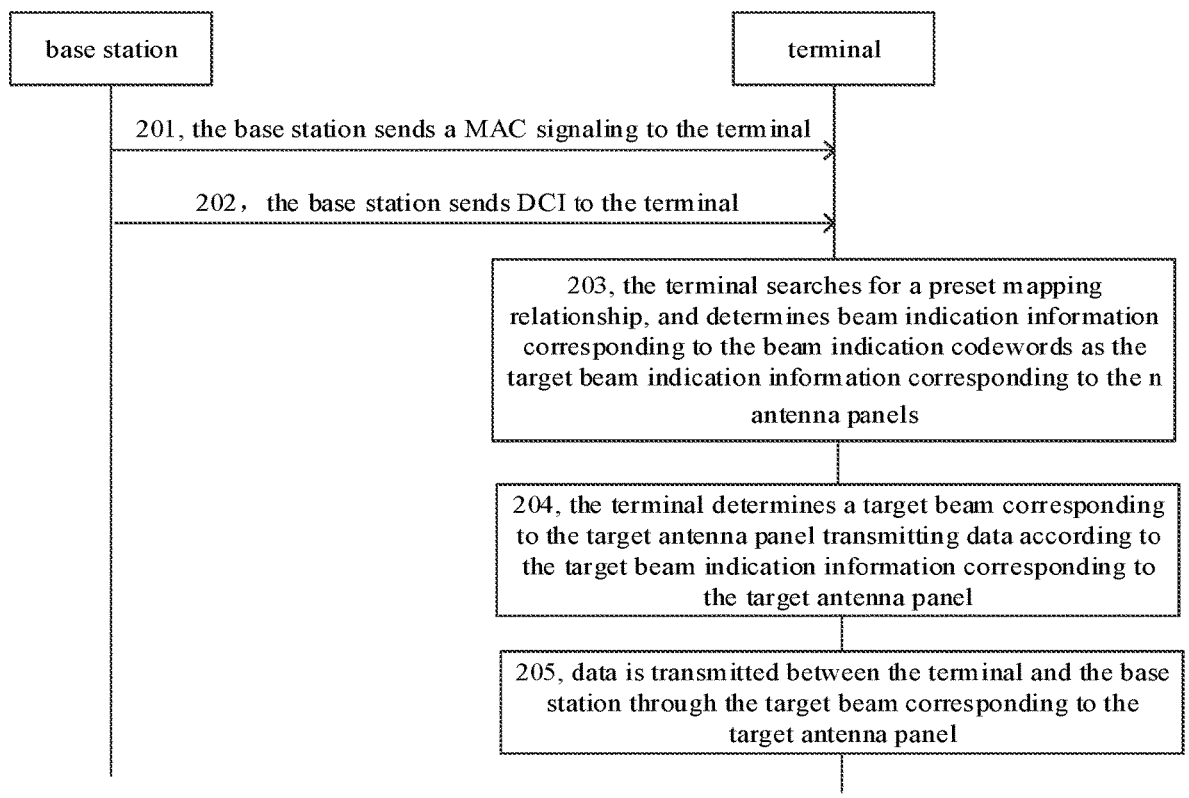
FIG. 2 is a flowchart of a data transmission method according to an exemplary embodiment.

FIG. 2 is a flowchart of a data transmission method according to an exemplary embodiment. This method is applied to the network architecture shown in FIG. 1. The method includes the following steps (201~205).

At step 201, a base station transmits a MAC signaling to a terminal.

In the embodiments of the disclosure, the MAC signaling is configured to activate multiple pieces of beam indication information separately corresponding to multiple antenna panels. Optionally, the terminal includes multiple antenna panels, and the MAC signaling is configured to activate beam indication information corresponding to all antenna panels of the terminal. For example, the terminal includes two antenna panels, panel #1 and panel #2 respectively, and the MAC signaling transmitted by the base station to the terminal is configured to activate the beam indication information corresponding to panel #1 and panel #2 respectively.

The beam indication information corresponding to the antenna panel is configured to indicate the corresponding beam when the antenna panel is configured to transmit data. For example, the beam indication information is the TCI state, and the TCI state corresponding to the target antenna panel is configured to indicate the receiving beam used when the terminal uses the target antenna panel to receive downlink data. In another example, the beam indication information is SRI, and the SRI corresponding to the target antenna panel is configured to instruct the terminal to use the transmitting beam when the target antenna panel transmits uplink data.

For example, the following downlink data transmission is taken as an example. The terminal includes two antenna panels, panel #1 and panel #2 respectively. The TCI status when the MAC signaling activates panel #1 includes: TCI #0, TCI #3, TCI #6, TCI #14, TCI #20, TCI #23, TCI #26 and TCI #44, and the TCI status when the MAC signaling activates panel #2 includes: TCI #(N+1), TCI #(N+4), TCI #(N+7), TCI #(N+12), TCI #(N+21), TCI #(N+24), TCI #(N+37) and TCI #(N+42). The value of N may be 0 or 64 or 128.

In addition, before the base station transmits the MAC signaling to the terminal, RRC signaling is transmitted to the terminal, and the beam indication information corresponding to the multiple antenna panels are notified to the terminal through the RRC signaling. The beam indication information corresponding to the target antenna panel activated by the MAC signaling is several pieces of the multiple beam indication information corresponding to the target antenna panel notified in the RRC signaling. For example, RRC signaling notifies the terminal of 64 TCI states corresponding to panel #1 and 64 TCI states corresponding to panel #2, and the MAC signaling activates 8 TCI states corresponding to panel #1 and 8 TCI states corresponding to panel #2. The 8 TCI states corresponding to panel #1 activated by MAC signaling are 8 of the 64 TCI states corresponding to panel #1 notified by RRC signaling, and the 8 TCI states corresponding to panel #2 activated by MAC signaling are 8 of the 64 TCI states corresponding to panel #2 notified by RRC signaling.

It should be noted that when the value of N is 0, for the TCI state configuration corresponding to panel #1 and panel #2, the panel corresponding to the notified TCI state needs to be indicated in the RRC signaling, and the MAC signaling also needs to indicate the panel corresponding to the activated TCI state, that is, indicate whether the activated TCI state belongs to panel #1 or panel #2. For example, the MAC signaling includes the correspondence between the identification information of the antenna panel and the activation information of the antenna panel, the activation information is configured to activate the beam indication information corresponding to the antenna panel. When the value of N is 64, the TCI state labeled with a number less than 64 corresponds to panel #1, and the TCI state with a number greater than or equal to 64 corresponds to panel #2. RRC signaling and MAC signaling may not additionally indicate the correspondence between the TCI state and the panel. When the value of N is 128, the TCI state labeled with a number less than 128 corresponds to panel #1, and the TCI state labeled with a number greater than or equal to 128 corresponds to panel #2. RRC signaling and MAC signaling may not additionally indicate the correspondence between the TCI state and the panel.

At step 202, the base station transmits DCI to the terminal.

In certain embodiments of the disclosure, the DCI includes beam indication codepoints. The beam indication codepoints may be a binary character string configured to indicate target beam indication information corresponding to n antenna panels in the multiple antenna panels, and n is a positive integer. The n antenna panels may be all antenna panels in the multiple antenna panels activated by MAC signaling, or may be part of the antenna panels in the multiple antenna panels activated by MAC signaling. For example, MAC signaling activates the TCI state corresponding to panel #1 and panel #2, respectively. The DCI signaling only indicates the target TCI state corresponding to panel #1, or only the target TCI state corresponding to panel #2, and the target TCI state corresponding to Panel #1 and panel #2 respectively.

In addition, the target beam indication information corresponding to the target antenna panel included in the n antenna panels is one piece of multiple beam indication information corresponding to the target antenna panel activated by MAC signaling. Taking panel #1 as an example, combined with the above example, the TCI state corresponding to panel #1 activated by MAC signaling includes: TCI #0, TCI #3, TCI #6, TCI #14, TCI #20, TCI #23, TCI #26 and TCI #44, the target TCI state corresponding to panel #1 indicated by the beam indication codepoints in the DCI signaling may be one of the above 8 TCI states, such as TCI #0.

In certain embodiments of the disclosure, since the antenna panel configured to transmit data is dynamically switched, that is, it is more appropriate to indicate the target antenna panel after switching and the target beam corresponding to the target antenna panel through DCI. Since the transmission interval of DCI is short, the DCI is transmitted at intervals of several time slots. Even if the antenna panel is switched frequently, the target antenna panel after switching and the target beam are correctly indicated through the DCI. However, MAC signaling always activates multiple antenna panels, so that in the process of dynamic switching of antenna panels, there is no need to repeatedly send MAC signaling, which helps to save signaling overhead. When the antenna panel used for data transmission is switched, the base station only needs to send DCI to the terminal, and the target antenna panel after switching and the target beam corresponding to the target antenna panel are indicated to the terminal through the DCI.

At step 203, a preset mapping relationship is searched by the terminal, and beam indication information corresponding to the beam indication codepoints is determined as the target beam indication information corresponding to the n antenna panels.

The preset mapping relationship is configured to indicate the correspondence between the beam indication codepoints and the beam indication information. Optionally, the preset mapping relationship may be preset and stored in the terminal and the base station in the form of a table.

Optionally, the MAC signaling is configured to activate the beam indication information corresponding to the two antenna panels respectively. The two antenna panels include the first antenna panel and the second antenna panel, which are denoted as panel #1 and panel #2. In a possible implementation, a first portion of the beam indication codepoints in the preset mapping relationship is configured to indicate target beam indication information corresponding to the first antenna panel, a second portion of the beam indication codepoints in the preset mapping relationship is configured to indicate target beam indication information corresponding to the second antenna panel, and a third portion of the beam indication codepoints in the preset mapping relationship is configured to indicate the target beam indication information corresponding to the first antenna panel and the target beam indication information corresponding to the second antenna panel.

Taking the length of the beam indication codepoints as 3 bits and the beam indication information as the TCI state as an example, the preset mapping relationship is exemplified as shown in Table-2.

TABLE 2

| beam indication codepoints | TCI state number |
|---|---|
| 000 | first TCI state in the activated TCI states of Panel#1 |
| 001 | second TCI state in the activated TCI states of Panel#1 |
| 010 | first TCI state in the activated TCI states of Panel#2 |
| 011 | second TCI state in the activated TCI states of Panel#2 |
| 100 | first TCI state in the activated TCI states of Panel#1 and first TCI state in the activated TCI states of Panel#2 |
| 101 | second TCI state in the activated TCI states of Panel#1 and second TCI state in the activated TCI states of Panel#2 |
| 110 | third TCI state in the activated TCI states of Panel#1 and first TCI state in the activated TCI states of Panel#2 |
| 111 | eighth TCI state in the activated TCI states of Panel#1 and third TCI state in the activated TCI states of Panel#2 |

The first portion of beam indication codepoints includes 000 and 001, 000 and 001 are used to indicate a target TCI state corresponding to panel #1. The second portion of beam indication codepoints includes 010 and 011, 010 and 011 are used to indicate a target TCI state corresponding to panel #2. The third portion of the beam indication codepoints includes 100, 101, 110, and 111. These four beam indication codepoints are used to indicate a target TCI state set. The target TCI state set includes a target TCI state corresponding to panel #1 and a target TCI state corresponding to panel #2.

After the terminal receives the DCI transmitted by the base station and reads the beam indication codepoints, the preset mapping relationship shown in Table-2 is found, and then based on the TCI state corresponding to each antenna panel activated by the MAC, a temporary table-3 (the third column in Table-3 changes with the change of the TCI state activated by the MAC) is obtained, the antenna panel to be activated by the base station and the target TCI state corresponding to each antenna panel to be activated are determined.

TABLE 3

| beam indication codepoints | TCI state number | Remarks: actual TCI state |
|---|---|---|
| 000 | first TCI state in the activated TCI states of Panel#1 | TCI#0 |
| 001 | second TCI state in the activated TCI states of Panel#1 | TCI#3 |
| 010 | first TCI state in the activated TCI states of Panel#2 | TCI# (N + 1) |
| 011 | second TCI state in the activated TCI states of Panel#2 | TCI# (N + 4) |
| 100 | first TCI state in the activated TCI states of Panel#1 and first TCI state in the activated TCI states of Panel#2 | TCI#0 & TCI# (N + 1) |
| 101 | second TCI state in the activated TCI states of Panel#1 and second TCI state in the activated TCI states of Panel#2 | TCI#3 & TCI# (N + 4) |
| 110 | third TCI state in the activated TCI states of Panel#1 and first TCI state in the activated TCI states of Panel#2 | TCI#6 & TCI# (N + 1) |
| 111 | eighth TCI state in the activated TCI states of Panel#1 and third TCI state in the activated TCI states of Panel#2 | TCI#44 & TCI# (N + 7) |

In addition, in the above embodiments, the length of the beam indication codepoints of 3 bits is only taken as an example, and the length of the beam indication codepoints may be greater than or equal to 3 bits. Assuming that the terminal has 2 antenna panels, denoted as panel #1 and panel #2, and 8 TCI states of each antenna panel is activated by MAC signaling, the beam indication codepoints indicates that there are 8 types of target TCI states corresponding to panel #1. The beam indication codepoints indicates that there are 8 types of target TCI states corresponding to panel #2, and the beam indication codepoints indicates that the target TCI state corresponding to panel #1 and panel #2 respectively has 8×8=64 cases, so there are 8+8+64=80 cases in total. If the length of the beam indication codepoints is 7 bits, all 80 cases are included in the preset mapping relationship. If the length of the beam indication codepoints is less than 7 bit, the number of states indicated by the beam indication codepoints is selected from the above 80 cases (that is, the number of beam indication codepoints is N bits, then the number of state indicated by the beam indication codepoints N″) and stored in the preset mapping relationship. For example, when the length of the beam indication codepoints is 6 bit, 64 types are selected from the above 80 cases and stored in the preset mapping relationship. When the length of the beam indication codepoints is 5 bit, then 32 cases are selected from the above 80 cases and saved in the preset mapping relationship. When the length of the beam indication codepoints is 4 bit, 16 cases are selected from the above 80 cases and saved in the preset mapping relationship. When the length of the beam indication codepoints is 3 bit, then 8 cases are selected from the above 80 and stored in the preset mapping relationship.

At step 204, the terminal determines a target beam used by the target antenna panel to transmit data according to the target beam indication information corresponding to the target antenna panel.

Taking the above example for explanation, assuming that the beam indication codepoints contained in the DCI is 000, the terminal searches table-3 to obtain the TCI state corresponding to the beam indication codepoints 000, which is the first TCI state in the activated TCI states of Panel #1, that is, TCI #0. Since TCI #0 belongs to panel #1, and assuming that the RS corresponding to TCI #0 is SSB index #1, the terminal determines the receiving beam adopted when receiving SSB index #1 on panel #1 as a target receiving beam for receiving downlink data.

For example, suppose that the beam indication codepoints contained in the DCI is 100, and the terminal searches table-3 to obtain the TCI state corresponding to the beam indication codepoints 100, which is the first TCI state in the activated TCI states of Panel #1 and the first TCI state in the activated TCI states of Panel #2, namely TCI #0 and TCI #(N+1). Since TCI #0 belongs to panel #1, TCI #(N+1) belongs to panel #2, and suppose that the RS corresponding to TCI #0 is SSB index #1, and the RS corresponding to TCI #(N+1) is SSB index #2. The terminal determines the receiving beam used when receiving SSB index #1 on panel #1 and the receiving beam used when receiving SSB index #2 on panel #2 as the target receiving beams for receiving downlink data.

At step 205, data is transmitted between the terminal and the base station through the target beam.

When the beam indication information is the TCI state, the terminal determines the target receiving beam when the target antenna panel is used to receive downlink data according to the target TCI state corresponding to the target antenna panel, and then determines the target receiving beam corresponding to the target antenna panel to receive the downlink data.

When the beam indication information is SRI, the terminal determines the target transmitting beam when the target antenna panel is used to transmit uplink data according to the target SRI corresponding to the target antenna panel, and then uses the target transmitting beam corresponding to the target antenna panel to transmit uplink data.

In conclusion, according to the technical solution of the embodiments of the disclosure, in the scenario of multiple antenna panels, the base station transmits MAC signaling and DCI to the terminal to indicate the target beam to the terminal when the target antenna panel is used to transmit data, so that the correct beam is selected to transmit data between different antenna panels and the terminal, which improves the success rate of data transmission in the multi-antenna panel scenario.

In addition, according to the technical solution of the embodiments of the disclosure, multiple beams are used for data transmission between the terminal and the base station at the same time, and the robustness of communication is improved.

Optionally, the MAC signaling is used to activate the beam indication information corresponding to the two antenna panels respectively. The two antenna panels include the first antenna panel and the second antenna panel, which are denoted as panel #1 and panel #2. In another possible implementation, each beam indication codeword in the preset mapping relationship is used to indicate the target beam indication information corresponding to the first antenna panel and the target beam indication information corresponding to the second antenna panel.

Taking the above example to illustrate, the preset mapping relationship is exemplified as shown in Table-4 below.

TABLE 4

| beam indication codepoints | TCI state number |
| --- | --- |
| 000 | first TCI state in the activated TCI states of Panel#1 and first TCI state in the activated TCI states of Panel#2 |
| 001 | second TCI state in the activated TCI states of Panel#1 and second TCI state in the activated TCI states of Panel#2 |
| 010 | third TCI state in the activated TCI states of Panel#1 and third TCI state in the activated TCI states of Panel#2 |
| 011 | fourth TCI state in the activated TCI states of Panel#1 and fourth TCI state in the activated TCI states of Panel#2 |
| 100 | fifth TCI state in the activated TCI states of Panel#1 and fifth TCI state in the activated TCI states of Panel#2 |
| 101 | sixth TCI state in the activated TCI states of Panel#1 and sixth TCI state in the activated TCI states of Panel#2 |
| 110 | seventh TCI state in the activated TCI states of Panel#1 and seventh TCI state in the activated TCI states of Panel#2 |
| 111 | eighth TCI state in the activated TCI states of Panel#1 and eighth TCI state in the activated TCI states of Panel#2 |

After the terminal receives the DCI transmitted by the base station and reads the beam indication codepoints from the DCI, and the preset mapping relationship shown in Table-4 is searched, and a temporary table-5 (the third column in Table-5 changes with the change of the TCI state activated by the MAC) is obtained in combination with the TCI state corresponding to each antenna panel activated by the MAC, such that the antenna panel to be activated by the base station and the target TCI state corresponding to each antenna panel to be activated are determined.

TABLE 5

| beam indication codepoints | TCI state number | Remarks: actual TCI state |
|---|---|---|
| 000 | first TCI state in the activated TCI states of Panel#1 and first TCI state in the activated TCI states of Panel#2 | TCI#0 & TCI# (N + 1) |
| 001 | second TCI state in the activated TCI states of Panel#1 and second TCI state in the activated TCI states of Panel#2 | TCI#3 & TCI# (N + 4) |
| 010 | third TCI state in the activated TCI states of Panel#1 and third TCI state in the activated TCI states of Panel#2 | TCI#6 & TCI# (N + 7) |
| 011 | fourth TCI state in the activated TCI states of Panel#1 and fourth TCI state in the activated TCI states of Panel#2 | TCI#14 & TCI# (N + 12) |
| 100 | fifth TCI state in the activated TCI states of Panel#1 and fifth TCI state in the activated TCI states of Panel#2 | TCI#20 & TCI# (N + 21) |
| 101 | sixth TCI state in the activated TCI states of Panel#1 and sixth TCI state in the activated TCI states of Panel#2 | TCI#23 & TCI# (N + 24) |
| 110 | seventh TCI state in the activated TCI states of Panel#1 and seventh TCI state in the activated TCI states of Panel#2 | TCI#26 & TCI# (N + 37) |
| 111 | eighth TCI state in the activated TCI states of Panel#1 and eighth TCI state in the activated TCI states of Panel#2 | TCI#44 & TCI# (N + 42) |

In this implementation, although multiple antenna panels are activated by the base station through the DCI, the terminal decides by itself whether to activate all the multiple antenna panels or activate only a part of the antenna panels. For example, if the terminal only activates the first antenna panel, the terminal determines the corresponding first target beam when the first antenna panel is used to transmit data according to the target beam indication information corresponding to the first antenna panel, and the first target beam corresponding to the first antenna panel is adopted to transmit data to the base station. If the terminal only activates the second antenna panel, the terminal determines the corresponding second target beam when the second antenna panel is used to transmit data according to the target beam indication information corresponding to the second antenna panel, and uses the second target beam corresponding to the second antenna panel to transmit data to the base station. If the terminal activates the first antenna panel and the second antenna panel, the terminal determines the corresponding first target beam when the first antenna panel is used to transmit data according to the target beam indication information corresponding to the first antenna panel and the second antenna panel. When the second antenna panel is used to transmit data, the corresponding second target beam is used, the first target beam corresponding to the first antenna panel is used to transmit data to the base station, and the second target beam corresponding to the second antenna panel is used to transmit data to the base station.

Taking the above example for explanation, assuming that the beam indication codepoints contained in the DCI is 000, the terminal searches Table-5 to obtain the TCI state corresponding to the beam indication codepoints 000, which are the first TCI state of the activated TCI states of Panel #1 and the first TCI state of the activated TCI states of Panel #2, that is, TCI #0 and TCI #(N+1), and TCI #0 belongs to panel #1, TCI #(N+1) belongs to panel #2, assuming that the RS corresponding to TCI #0 is SSB index #1, the RS corresponding to TCI #(N+1) is SSB index #2. When the terminal decides to activate only panel #1, the terminal determines to use the receiving beam used when receiving SSB index #1 on panel #1 as the target receiving beam to receive downlink data transmitted by the base station. When the terminal decides to activate only panel #2, the terminal determines to use the receiving beam used when receiving SSB index #2 on panel #2 as the target receiving beam to receive downlink data transmitted by the base station. When the terminal decides to activate panel #1 and panel #2, the terminal determines to use the receiving beam used when receiving SSB index #1 on panel #1, and the receiving beam used when receiving SSB index #2 on panel #2, as the target receiving beam for receiving downlink data, and the downlink data transmitted by the base station.

In conclusion, in the technical solution of the embodiments, the terminal chooses which antenna panel to activate by itself to achieve high flexibility.

The apparatus embodiments of the disclosure are described as follows, the apparatus is used to implement the method embodiments of the disclosure. For details that are not disclosed in the apparatus embodiments of the disclosure, please refer to the method embodiments of the disclosure.

Figure 3:
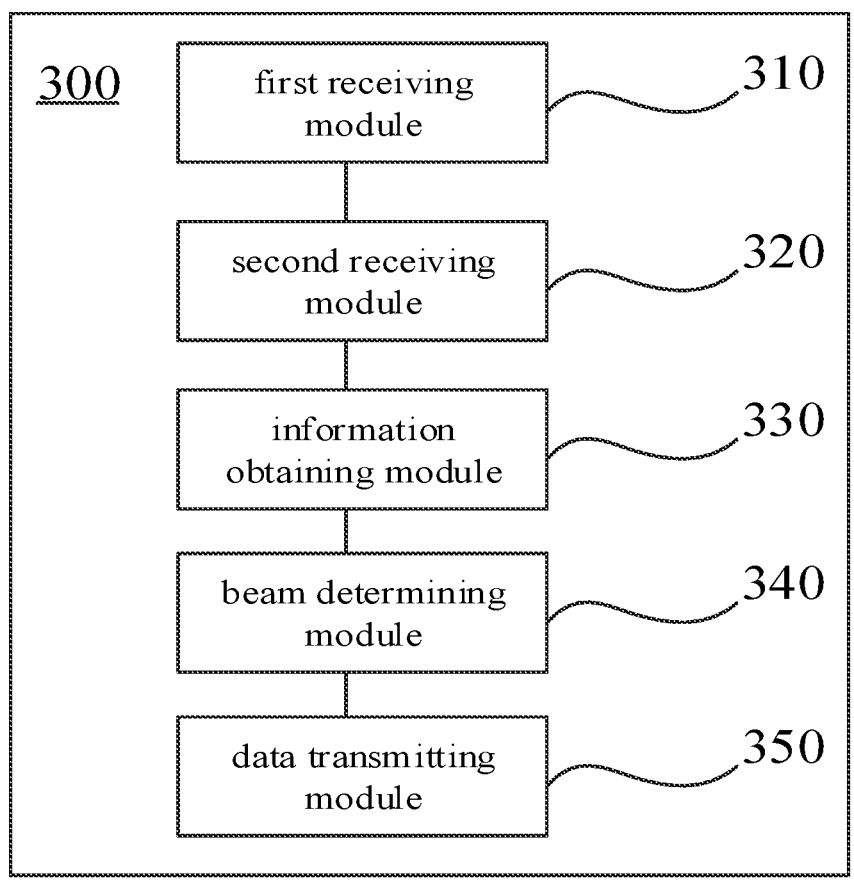
FIG. 3 is a block diagram of a data transmission apparatus according to an exemplary embodiment.

FIG. 3 is a block diagram of a data transmission apparatus according to an exemplary embodiment. The device has the function of realizing the above-mentioned method examples on the terminal side, and the function is realized by hardware, or by hardware executing corresponding software. The device may be the terminal described above, or may be set in the terminal. The apparatus 300 may include: a first receiving module 310, a second receiving module 320, an information obtaining module 330, a beam determining module 340, and a data transmitting module 350.

The first receiving module 310 is configured to receive, by a terminal, a media access control (MAC) signaling transmitted by a base station, in which the MAC signaling is configured to activate multiple pieces of beam indication information separately corresponding to multiple antenna panels, the beam indication information associated with an antenna panel is configured to indicate beam(s) of the corresponding antenna panel for transmitting data.

The second receiving module 320 is configured to receive, by the terminal, downlink control information (DCI) transmitted by the base station, in which beam indication codepoints in the DCI are configured to indicate multiple pieces of target beam indication information separately corresponding to n antenna panels in the multiple antenna panels, the target beam indication information corresponding to one target antenna panel in the n antenna panels is one piece of the beam indication information corresponding to the target antenna panel activated by the MAC signaling, and n is a positive integer.

The information obtaining module 330 is configured to search for a preset mapping relationship by the terminal so as to obtain the beam indication information corresponding to the beam indication codepoints and determine the beam indication information as the beam indication information corresponding to the n antenna panels.

The beam determining module 340 is configured to determine, by the terminal, a target beam used by the target antenna panel to transmit data.

The data transmitting module 350 is configured to data by the terminal with the base station via the target beam corresponding to the target antenna panel.

In conclusion, in the technical solution of the embodiments of the disclosure, in the scenario of multiple antenna panels, the base station sends the MAC signaling and DCI to the terminal to indicate the target beam when the target antenna panel is used to transmit data to the terminal, so that the correct beam is selected to transmit data between different antenna panels and the terminal, and the success rate of data transmission is improved in the multi-antenna panel scenario.

Optionally, the MAC signaling is configured to activate beam indication information separately corresponding to two antenna panels, and the two antenna panels include a first antenna panel and a second antenna panel; a first portion of the beam indication codepoints in the preset mapping relationship is configured to indicate target beam indication information corresponding to the first antenna panel; a second portion of the beam indication codepoints in the preset mapping relationship is configured to indicate target beam indication information corresponding to the second antenna panel; and a third portion of the beam indication codepoints in the preset mapping relationship is configured to indicate the target beam indication information corresponding to the first antenna panel and the target beam indication information corresponding to the second antenna panel.

Optionally, the MAC signaling is configured to activate beam indication information corresponding to two antenna panels, and the two antenna panels include a first antenna panel and a second antenna panel; each beam indication codeword in the preset mapping relationship is configured to indicate target beam indication information corresponding to the first antenna panel and target beam indication information corresponding to the second antenna panel.

Optionally, the beam determining module 340 is configured to determine, when the first antenna panel is activated by the terminal, a first target beam using which the first antenna panel transmits data according to the target beam indication information corresponding to the first antenna panel, and the data transmitting module 350 is configured to transmit data between the terminal and the base station through the first target beam corresponding to the first antenna panel; or, the beam determining module 340 is configured to determine, when the second antenna panel is activated by the terminal, a second target beam using which the second antenna panel transmits data according to the target beam indication information corresponding to the second antenna panel, and the data transmitting module 350 is configured to transmit data between the terminal and the base station through the second target beam corresponding to the second antenna panel; or, the beam determining module 340 is configured to determine, when the first antenna panel and the second antenna panel are activated by the terminal, the first target beam using which the first antenna panel transmits data and the second target beam using which the second antenna panel transmits data according to the target beam indication information corresponding to the first antenna panel and the second antenna panel, and the data transmitting module 350 is configured to transmit data between the terminal and the base station through the second target beam corresponding to the second antenna panel and the first target beam corresponding to the first antenna panel, and transmit data between the terminal and the base station through the second target beam corresponding to the second antenna panel.

Optionally, a length of the beam indication codepoints is greater than or equal to 3 bits.

Optionally, the MAC signaling includes a correspondence between identification information of an antenna panel and activation information of the antenna panel, and the activation information is configured to activate beam indication information corresponding to the antenna panel.

Optionally, the beam indication information is a transmission configuration indication (TCI) state, the TCI state corresponding to the target antenna panel is configured to indicate a receiving beam used when the terminal receives downlink data through the target antenna panel; or, the beam indication information is spatial relationship information (SRI), and the SRI corresponding to the target antenna panel is configured to indicate a transmission beam used when the terminal transmits uplink data through the target antenna panel.

Figure 4:
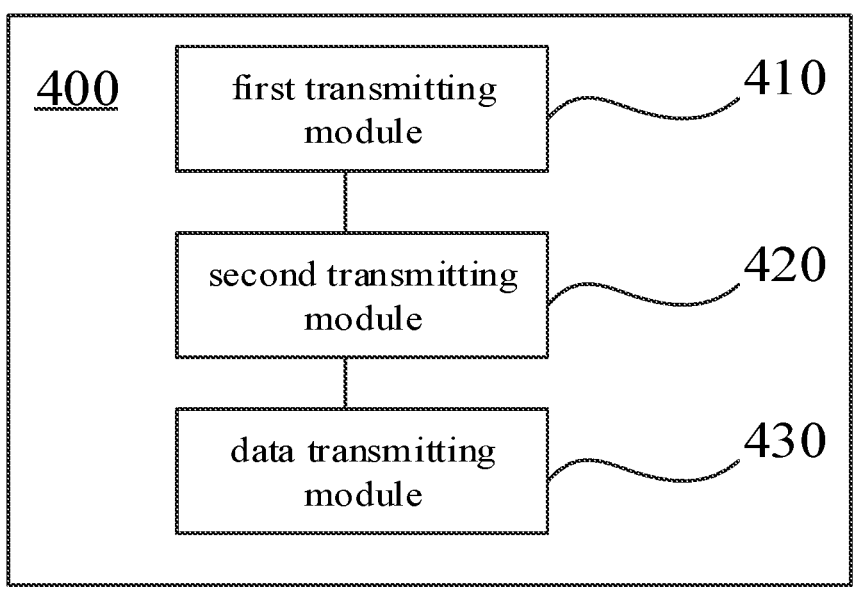
FIG. 4 is a block diagram of a data transmission apparatus according to another exemplary embodiment.

FIG. 4 is a block diagram of a data transmission apparatus according to another exemplary embodiment. The apparatus has the function of realizing the above method examples on the base station side, and the function is realized by hardware, or by hardware executing corresponding software. The apparatus may be the base station described above, or may be set in the base station. The apparatus 400 may include: a first transmitting module 410, a second transmitting module 420, and a data transmitting module 430.

The first transmitting module 410 is configured to send, by a base station, a media access control (MAC) signaling to a terminal, the MAC signaling is configured to activate beam indication information corresponding to multiple antenna panels, the beam indication information associated with an antenna panel is configured to indicate beam(s) of the corresponding antenna panel for transmitting data.

The second transmitting module 420 is configured to send, by the base station, a downlink control information (DCI) to the terminal, beam indication codepoints contained in the DCI are configured to indicate target beam indication information corresponding to n antenna panels in the multiple antenna panels, the target beam indication information corresponding to a target antenna panel in the n antenna panels is one piece of the beam indication information corresponding to the target antenna panel activated by the MAC signaling, and n is a positive integer.

The data transmitting module 430 is configured to transmit data between the base station and the terminal through the n antenna panels.

In conclusion, in the technical solution of the embodiments of the disclosure, in the scenario of multiple antenna panels, the base station transmits the MAC signaling and DCI to the terminal to indicate the target beam when the target antenna panel is used to transmit data to the terminal, so that the correct beam is selected to transmit data between different antenna panels and the terminal, and the success rate of data transmission is improved in the multi-antenna panel scenario.

It should be noted that, when the function is realized by the apparatus of the above embodiments, only the above functional modules used are divided as an example for illustration. In actual applications, the above functions are allocated by different functional modules according to actual needs, that is, the content structure of the apparatus is divided into different functional modules to complete all or part of the functions described above.

Regarding the apparatus in the above embodiments, the specific manner in which each module performs the operation has been described in detail in the method embodiments, and detailed description will not be given here.

The exemplary embodiment of the disclosure also provides a data transmission apparatus, to implement a terminal-side data transmission method of the disclosure. The apparatus may be the terminal described above, or may be set in the terminal. The device includes a processor and a memory for storing executable instructions of the processor. The processor is configured to: receive, by a terminal, a media access control (MAC) signaling transmitted by a base station, in which the MAC signaling is configured to activate beam indication information corresponding to multiple antenna panels, the beam indication information associated with an antenna panel is configured to indicate beam(s) of the corresponding antenna panel for transmitting data; receive, by the terminal, downlink control information (DCI) transmitted by the base station, wherein beam indication codepoints in the DCI are configured to indicate target beam indication information corresponding to n antenna panels in the multiple antenna panels, the target beam indication information corresponding to a target antenna panel in the n antenna panels is one piece of the beam indication information corresponding to the target antenna panel activated by the MAC signaling, and n is a positive integer; search for a preset mapping relationship by the terminal, and determine beam indication information corresponding to the beam indication codepoints as the target beam indication information corresponding to the n antenna panels; determine, by the terminal, a target beam used by the target antenna panel to transmit data according to the target beam indication information corresponding to the target antenna panel; and transmit data between the terminal and the base station through the target beam.

Optionally, the MAC signaling is configured to activate beam indication information corresponding to two antenna panels, and the two antenna panels include a first antenna panel and a second antenna panel; a first portion of the beam indication codepoints in the preset mapping relationship is configured to indicate target beam indication information corresponding to the first antenna panel; a second portion of the beam indication codepoints in the preset mapping relationship is configured to indicate target beam indication information corresponding to the second antenna panel; and a third portion of the beam indication codepoints in the preset mapping relationship is configured to indicate the target beam indication information corresponding to the first antenna panel and the target beam indication information corresponding to the second antenna panel.

Optionally, the MAC signaling is configured to activate beam indication information corresponding to two antenna panels, and the two antenna panels include a first antenna panel and a second antenna panel; each beam indication codeword in the preset mapping relationship is configured to indicate target beam indication information corresponding to the first antenna panel and target beam indication information corresponding to the second antenna panel.

Optionally, the processor is configured to: determine, when the first antenna panel is activated by the terminal, a first target beam using which the first antenna panel transmits data according to the target beam indication information corresponding to the first antenna panel, and transmit data between the terminal and the base station through the first target beam corresponding to the first antenna panel; or, determine, when the second antenna panel is activated by the terminal, a second target beam using which the second antenna panel transmits data according to the target beam indication information corresponding to the second antenna panel, and transmit data between the terminal and the base station through the second target beam corresponding to the second antenna panel; or, determine, when the first antenna panel and the second antenna panel are activated by the terminal, the first target beam using which the first antenna panel transmits data and the second target beam using which the second antenna panel transmits data according to the target beam indication information corresponding to the first antenna panel and the second antenna panel, and transmit data between the terminal and the base station through the second target beam corresponding to the second antenna panel and the first target beam corresponding to the first antenna panel, and transmit data between the terminal and the base station through the second target beam corresponding to the second antenna panel.

Optionally, a length of the beam indication codepoints is greater than or equal to 3 bits.

Optionally, the MAC signaling includes a correspondence between identification information of an antenna panel and activation information of the antenna panel, and the activation information is configured to activate beam indication information corresponding to the antenna panel.

Optionally, the beam indication information is a transmission configuration indication (TCI) state, and the TCI state corresponding to the target antenna panel is configured to indicate a receiving beam used when the terminal receives downlink data through the target antenna panel; or, the beam indication information is spatial relationship information (SRI), and the SRI corresponding to the target antenna panel is configured to indicate a transmission beam used when the terminal transmits uplink data through the target antenna panel.

The exemplary embodiment of the disclosure also provides a data transmission apparatus, to implement the data transmission method on the base station side provided by the disclosure. The apparatus may be the base station described above, or may be set in the base station. The apparatus includes a processor and a memory for storing executable instructions of the processor. The processor is configured to: send, by a base station, a media access control (MAC) signaling to a terminal, the MAC signaling is configured to activate beam indication information corresponding to multiple antenna panels, the beam indication information associated with an antenna panel is configured to indicate beam(s) of the corresponding antenna panel for transmitting data; send, by the base station, a downlink control information (DCI) to the terminal, beam indication codepoints contained in the DCI are configured to indicate target beam indication information corresponding to n antenna panels in the multiple antenna panels, the target beam indication information corresponding to a target antenna panel in the n antenna panels is one piece of the beam indication information corresponding to the target antenna panel activated by the MAC signaling, and n is a positive integer; and transmit data between the base station and the terminal through the n antenna panels.

The foregoing mainly introduces the solution of the embodiments of the disclosure from the perspective of interaction between the terminal and the base station. It is understood that, in order to implement the above functions, the terminal and the base station include hardware structures and/or software modules corresponding to each function. In combination with the units and algorithm steps of the examples described in the embodiments of the disclosure, the embodiments of the disclosure are implemented in the form of hardware or a combination of hardware and computer software. Whether a certain function is executed by hardware or computer software-driven hardware depends on the specific application and design constraint conditions of the technical solution. Those skilled in the art use different methods for each specific application to implement the described functions, but such implementation should not be considered as going beyond the scope of the technical solution of the embodiments of the disclosure.

Figure 5:
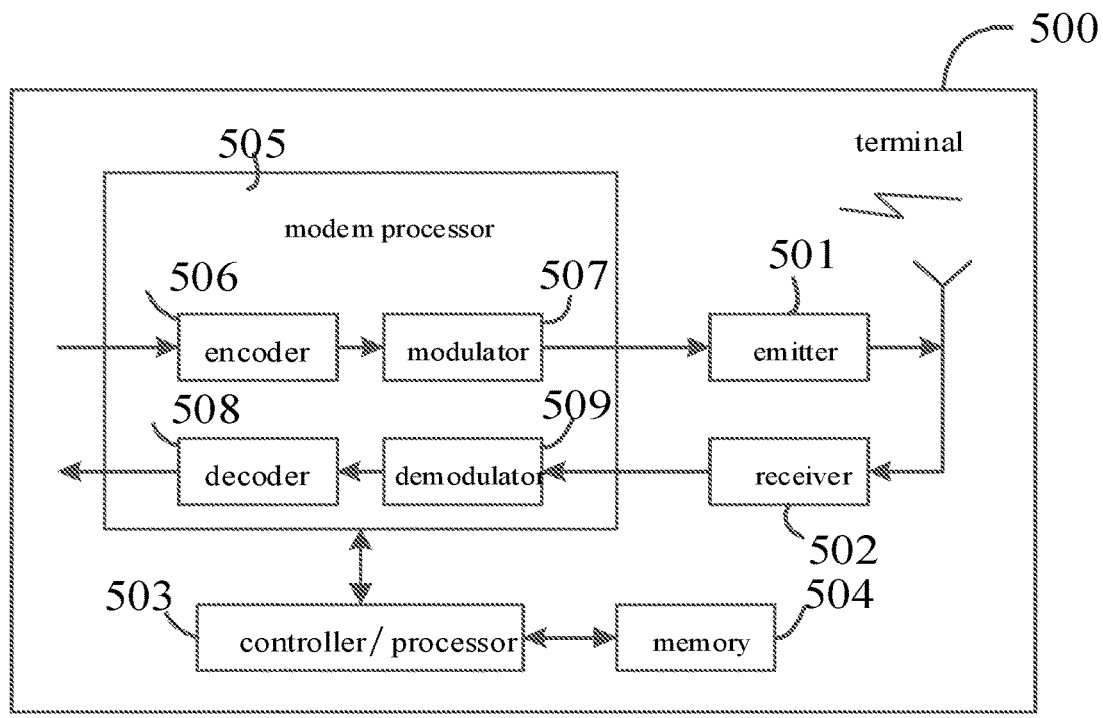
FIG. 5 is a schematic diagram of a terminal according to an exemplary embodiment.

FIG. 5 is a schematic diagram of a terminal according to an exemplary embodiment.

The terminal 500 includes a transmitter 501, a receiver 502 and a processor 503. The processor 503 may also be a controller, which is represented as "controller/processor 503" in FIG. 5. Optionally, the terminal 500 may further include a modem processor 505, where the modem processor 505 may include an encoder 506, a modulator 507, a decoder 508, and a demodulator 509.

In an example, the transmitter 501 adjusts (for example, analog conversion, filtering, amplification and up-conversion) output samples and generates an uplink signal, the uplink signal is transmitted to the base station described in the above embodiments via an antenna. On the downlink, the antenna receives the downlink signal transmitted by the base station in the above embodiments. The receiver 502 adjusts (e.g., filters, amplification, down-conversion and digitization) the signal received from the antenna and provides input samples. In the modem processor 505, the encoder 506 receives service data and signaling messages to be transmitted on the uplink, and processes the service data and signaling messages (for example, formatting, encoding and intertwining). The modulator 507 further processes (for example, symbol mapping and modulation) the encoded service data and signaling messages and provides the output samples. The demodulator 509 processes (e.g., demodulates) the input samples and provides symbol estimates. The decoder 508 processes (e.g., de-interleaves and decodes) the symbol estimate and provides decoded data and signaling messages transmitted to the terminal 500. The encoder 506, the modulator 507, the demodulator 509 and the decoder 508 are implemented by a synthesized modem processor 505. These units are processed according to the wireless access technology adopted by the radio access network (for example, the access technology of LTE and other evolution systems). It should be noted that when the terminal 500 does not include the modem processor 505, the foregoing functions of the modem processor 505 may also be performed by the processor 503.

The processor 503 controls and manages actions of the terminal 500, and is configured to execute the processing procedure performed by the terminal 500 in the foregoing embodiments of the disclosure. For example, the processor 503 is further configured to execute each step on the terminal side in the foregoing method embodiments, and/or other steps of the technical solution of the embodiments of the disclosure.

Further, the terminal 500 may further include a memory 504, and the memory 504 is configured to store program codes and data for the terminal 500.

It is understandable that FIG. 5 only shows a simplified design of the terminal 500. In practical applications, the terminal 500 may include any number of transmitters, receivers, processors, modem processors and memories, and all terminals that can implement the embodiments of the disclosure are within the protection scope of the embodiments of the disclosure.

Figure 6:
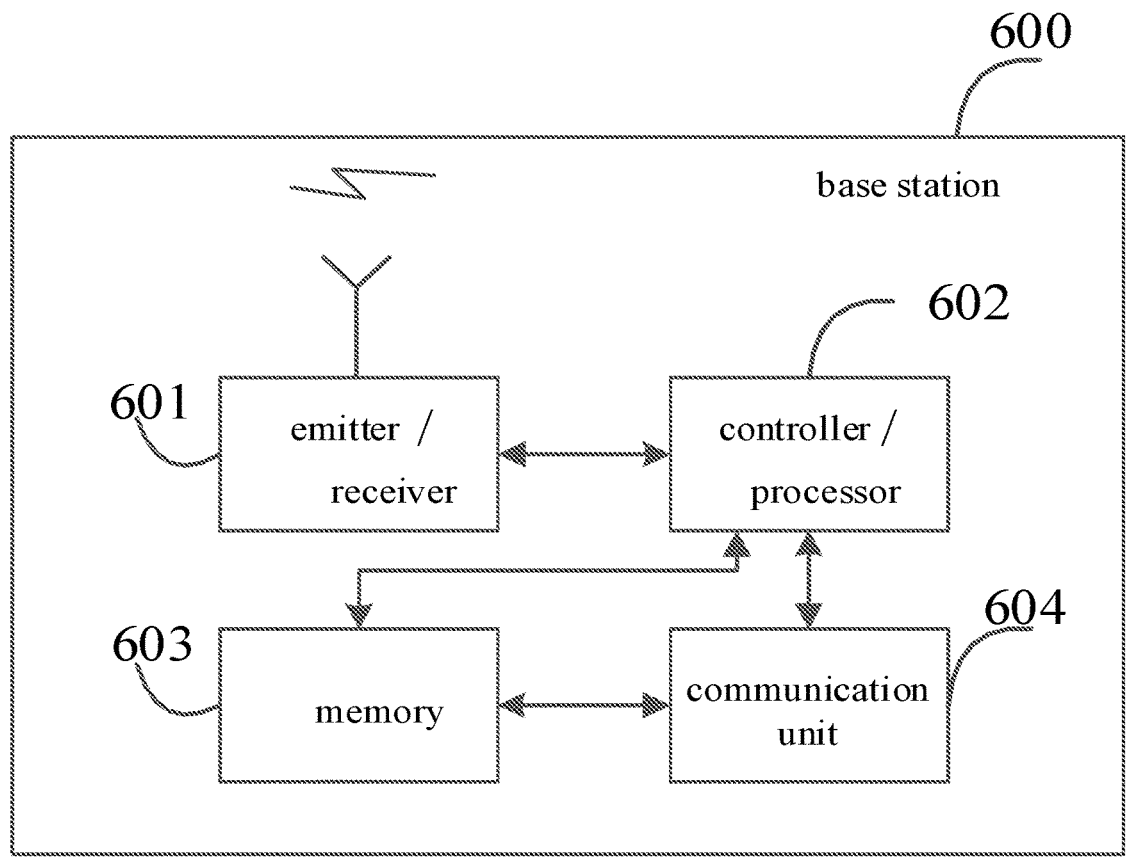
FIG. 6 is a schematic diagram of a base station according to an exemplary embodiment.

FIG. 6 is a schematic diagram of a base station according to an exemplary embodiment.

The base station 600 includes a transmitter/receiver 601 and a processor 602. The processor 602 may also be a controller, which is represented as "controller/processor 602" in FIG. 6. The transmitter/receiver 601 is configured to support sending and receiving of information between the base station and the terminal in the above embodiments, and to support communication between the base station and other network entities. The processor 602 performs various functions for communicating with the terminal. In the uplink, the uplink signal from the terminal is received via the antenna, demodulated by the receiver 601 (for example, demodulating the high-frequency signal into a baseband signal), and further processed by the processor 602 to restore service data and signaling messages the terminal. On the downlink, the service data and signaling messages are processed by the processor 602, and modulated by the transmitter 601 (for example, the baseband signal is modulated into a high-frequency signal) to generate a downlink signal, which is transmitted to the terminal via the antenna. It should be noted that the above demodulation or modulation function may also be completed by the processor 602. For example, the processor 602 is further configured to execute each step on the base station side in the foregoing method embodiments, and/or other steps of the technical solution of the embodiments of the disclosure.

Further, the base station 600 may further include a memory 603, and the memory 603 is configured to store program codes and data of the base station 600. In addition, the base station 600 may further include a communication unit 604. The communication unit 604 is configured to support the base station 600 to communicate with other network entities (for example, network devices in a core network). For example, in a 5G NR system, the communication unit 604 may be an NG-U interface for supporting the base station 600 to communicate with a UPF (User Plane Function) entity; or, the communication unit 604 may also be an NG-U interface, configured to support communication between the base station 600 and a AMF (Access and Mobility Management Function) entities.

It is understood that FIG. 6 only shows a simplified design of the base station 600. In practical applications, the base station 800 may include any number of transmitters, receivers, processors, controllers, memories and communication units, and all base stations that can implement the embodiments of the disclosure are within the protection scope of the embodiments of the disclosure.

The embodiments of the disclosure also provide a non-transitory computer-readable storage medium on which computer programs are stored, and when the computer program is executed by the processor of the terminal, the data transmission method on the base station side as described above is implemented.

The embodiments of the disclosure also provide a non-transitory computer-readable storage medium on which computer programs are stored, and when the computer program is executed by the processor of the base station, the data transmission method on the base station side as described above is implemented.

It should be understood that the "plurality" mentioned herein refers to "two or more". "And/or" describes an association relationship of the associated objects, indicating that there are three types of relationships, for example, A and/or B, that is, A alone exists, A and B exist at the same time, and B exists alone. The character "/" generally indicates that the associated objects before and after are in an "or" relationship.

Other embodiments of the disclosure will be apparent to those skilled in the art from consideration of the specification and practice of the disclosure disclosed here. This application is intended to cover any variations, uses, or adaptations of the disclosure following the general principles thereof and including such departures from the disclosure as come within known or customary practice in the art. It is intended that the specification and examples be considered as exemplary only, with a true scope and spirit of the disclosure being indicated by the following claims.

It will be appreciated that the disclosure is not limited to the exact construction that has been described above and illustrated in the accompanying drawings, and that various modifications and changes can be made without departing from the scope thereof. It is intended that the scope of the disclosure only be limited by the appended claims.

What is claimed is:

1. A data transmission method, comprising:
    receiving, by a terminal, a media access control (MAC) signaling sent by a base station, wherein the MAC signaling is configured to activate multiple pieces of beam indication information separately corresponding to multiple antenna panels, the beam indication information associated with an antenna panel is configured to indicate beam(s) of the corresponding antenna panel for transmitting data;
    receiving, by the terminal, downlink control information (DCI) sent by the base station, wherein beam indication codepoints in the DCI are configured to indicate multiple pieces of target beam indication information separately corresponding to n antenna panels in the multiple antenna panels, the target beam indication information corresponding to one target antenna panel in the n antenna panels is one piece of the beam indication information corresponding to the target antenna panel activated by the MAC signaling, and n is a positive integer;
    searching for a preset mapping relationship by the terminal so as to obtain the beam indication information corresponding to the beam indication codepoints and determine the beam indication information as the beam indication information corresponding to the n antenna panels;
    determining, by the terminal, a target beam used by the target antenna panel to transmit data according to the target beam indication information corresponding to the target antenna panel; and
    transmitting data by the terminal with the base station via the target beam corresponding to the target antenna panel.

2. The method of claim 1, wherein the MAC signaling is configured to activate beam indication information separately corresponding to two antenna panels, and the two antenna panels comprise a first antenna panel and a second antenna panel; wherein
    a first portion of the beam indication codepoints in the preset mapping relationship is configured to indicate target beam indication information corresponding to the first antenna panel;
    a second portion of the beam indication codepoints in the preset mapping relationship is configured to indicate target beam indication information corresponding to the second antenna panel; and
    a third portion of the beam indication codepoints in the preset mapping relationship is configured to indicate the target beam indication information corresponding to the first antenna panel and the target beam indication information corresponding to the second antenna panel.

3. The method of claim 1, wherein the MAC signaling is configured to activate beam indication information separately corresponding to two antenna panels, and the two antenna panels comprise a first antenna panel and a second antenna panel; wherein
    each beam indication codepoint in the preset mapping relationship is configured to indicate target beam indication information corresponding to the first antenna panel and target beam indication information corresponding to the second antenna panel.

4. The method of claim 3, wherein determining, by the terminal, the target beam used by the target antenna panel to transmit data according to the target beam indication information corresponding to the target antenna panel; and transmitting data between the terminal and the base station through the target beam comprise at least one of:
    determining, when the first antenna panel is activated by the terminal, a first target beam using which the first antenna panel transmits data according to the target beam indication information corresponding to the first antenna panel, and transmitting data between the terminal and the base station through the first target beam corresponding to the first antenna panel;
    and,
    determining, when the second antenna panel is activated by the terminal, a second target beam using which the second antenna panel transmits data according to the target beam indication information corresponding to the second antenna panel, and transmitting data between the terminal and the base station through the second target beam corresponding to the second antenna panel;
    and,
    determining, when the first antenna panel and the second antenna panel are activated by the terminal, the first target beam using which the first antenna panel transmits data and the second target beam using which the second antenna panel transmits data according to the target beam indication information separately corresponding to the first antenna panel and the second antenna panel, and transmitting data between the terminal and the base station through the second target beam corresponding to the second antenna panel and the first target beam corresponding to the first antenna panel, and transmitting data between the terminal and the base station through the second target beam corresponding to the second antenna panel.

5. The method of claim 1, wherein a length of the beam indication codepoints is greater than or equal to 3 bits.

6. The method of claim 1, wherein the MAC signaling comprises a correspondence between identification information of an antenna panel and activation information of the antenna panel, and the activation information is configured to activate beam indication information corresponding to the antenna panel.

7. The method of claim 1, wherein
the beam indication information is at least one of a transmission configuration indication (TCI) state and spatial relationship information (SRI), and the TCI state corresponding to the target antenna panel is configured to indicate a receiving beam used when the terminal receives downlink data through the target antenna panel; the SRI corresponding to the target antenna panel is configured to indicate a transmission beam used when the terminal transmits uplink data through the target antenna panel.

8. A data transmission method, comprising:
sending, by a base station, a media access control (MAC) signaling to a terminal, wherein the MAC signaling is configured to activate beam indication information corresponding to multiple antenna panels, the beam indication information associated with an antenna panel is configured to indicate beam(s) of the corresponding antenna panel for transmitting data;
sending, by the base station, a downlink control information (DCI) to the terminal, wherein beam indication codepoints contained in the DCI are configured to indicate multiple pieces of target beam indication information separately corresponding to n antenna panels in the multiple antenna panels, the target beam indication information corresponding to one target antenna panel in the n antenna panels is one piece of the beam indication information corresponding to the target antenna panel activated by the MAC signaling, and n is a positive integer; and
transmitting data by the base station with the terminal via the n antenna panels.

9. A data transmission apparatus, applied to a terminal, comprising:
one or more processors;
a memory storing instructions executable by the one or more processors;
wherein the one or more processors are configured to:
receive, by a terminal, a media access control (MAC) signaling sent by a base station, wherein the MAC signaling is configured to activate multiple pieces of beam indication information separately corresponding to multiple antenna panels, the beam indication information associated with an antenna panel is configured to indicate beam(s) of the corresponding antenna panel for transmitting data;
receive, by the terminal, downlink control information (DCI) sent by the base station, wherein beam indication codepoints in the DCI are configured to indicate multiple pieces of target beam indication information separately corresponding to n antenna panels in the multiple antenna panels, the target beam indication information corresponding to one target antenna panel in the n antenna panels is one piece of the beam indication information corresponding to the target antenna panel activated by the MAC signaling, and n is a positive integer;
search for a preset mapping relationship by the terminal so as to obtain the beam indication information corresponding to the beam indication codepoints and determine the beam indication information as the beam indication information corresponding to the n antenna panels;
determine, by the terminal, a target beam used by the target antenna panel to transmit data according to the target beam indication information corresponding to the target antenna panel; and
transmit data by the terminal with the base station via the target beam corresponding to the target antenna panel.

10. The apparatus of claim 9, wherein the MAC signaling is configured to activate beam indication information separately corresponding to two antenna panels, and the two antenna panels comprise a first antenna panel and a second antenna panel; wherein
a first portion of the beam indication codepoints in the preset mapping relationship is configured to indicate target beam indication information corresponding to the first antenna panel;
a second portion of the beam indication codepoints in the preset mapping relationship is configured to indicate target beam indication information corresponding to the second antenna panel; and
a third portion of the beam indication codepoints in the preset mapping relationship is configured to indicate the target beam indication information corresponding to the first antenna panel and the target beam indication information corresponding to the second antenna panel.

11. The apparatus of claim 9, wherein the MAC signaling is configured to activate beam indication information separately corresponding to two antenna panels, and the two antenna panels comprise a first antenna panel and a second antenna panel;
each beam indication codepoint in the preset mapping relationship is configured to indicate target beam indication information corresponding to the first antenna panel and target beam indication information corresponding to the second antenna panel.

12. The apparatus of claim 11, wherein the one or more processors are configured to perform at least one act of:
determining, when the first antenna panel is activated by the terminal, a first target beam using which the first antenna panel transmits data according to the target beam indication information corresponding to the first antenna panel, and transmitting data between the terminal and the base station through the first target beam corresponding to the first antenna panel;
and,
determining, when the second antenna panel is activated by the terminal, a second target beam using which the second antenna panel transmits data according to the target beam indication information corresponding to the second antenna panel, and transmitting data between the terminal and the base station through the second target beam corresponding to the second antenna panel;
and,
determining, when the first antenna panel and the second antenna panel are activated by the terminal, the first target beam using which the first antenna panel transmits data and the second target beam using which the second antenna panel transmits data according to the target beam indication information separately corresponding to the first antenna panel and the second antenna panel, and transmitting data between the terminal and the base station through the second target beam corresponding to the second antenna panel and the first target beam corresponding to the first antenna panel, and transmitting data between the terminal and the base station through the second target beam corresponding to the second antenna panel.

13. The apparatus of claim 9, wherein a length of the beam indication codepoints is greater than or equal to 3 bits.

14. The apparatus of claim 9, wherein the MAC signaling comprises a correspondence between identification information of an antenna panel and activation information of the antenna panel, and the activation information is configured to activate beam indication information corresponding to the antenna panel.

15. The apparatus of claim 9, wherein
the beam indication information is at least one of a transmission configuration indication (TCI) state and spatial relationship information (SRI), and the TCI state corresponding to the target antenna panel is configured to indicate a receiving beam used when the terminal receives downlink data through the target antenna panel; the SRI corresponding to the target antenna panel is configured to indicate a transmission beam used when the terminal transmits uplink data through the target antenna panel.

\* \* \* \* \*